United States Patent
Hajmrle et al.

(10) Patent No.: US 7,291,577 B2
(45) Date of Patent: Nov. 6, 2007

(54) HYDROMETALLURGICAL PROCESS FOR PRODUCTION OF SUPPORTED CATALYSTS

(75) Inventors: Karel Hajmrle, Edmonton (CA); Syed Hussain, Edmonton (CA); Paul Albert Laplante, Edmonton (CA)

(73) Assignee: Sulzer Metco (Canada) Inc., Fort Saskatchewan, Alberta (CA)

( * ) Notice: Subject to any disclaimer, the term of this patent is extended or adjusted under 35 U.S.C. 154(b) by 659 days.

(21) Appl. No.: 10/458,103

(22) Filed: Jun. 10, 2003

(65) Prior Publication Data

US 2004/0033894 A1    Feb. 19, 2004

Related U.S. Application Data

(60) Provisional application No. 60/387,592, filed on Jun. 12, 2002.

(51) Int. Cl.
B01J 23/00 (2006.01)
B01J 21/00 (2006.01)
B01J 20/00 (2006.01)

(52) U.S. Cl. .................... 502/300; 502/66; 502/74; 502/182; 502/184; 502/185; 502/216; 502/217; 502/218; 502/222; 502/302; 502/326; 502/327; 502/337; 502/352; 502/415; 502/439

(58) Field of Classification Search ........... 502/300, 502/302, 333, 335, 216–218, 222, 182, 184, 502/185, 66, 74, 326, 327, 337, 352, 439, 502/415

See application file for complete search history.

(56) References Cited

U.S. PATENT DOCUMENTS 2,727,023 A * 12/1955 Evering et al. ............. 526/103
3,235,508 A * 2/1966 Mills .......................... 502/151
3,451,948 A * 6/1969 Scott ............................ 502/68
3,684,742 A * 8/1972 Pollitzer ...................... 502/262
3,686,138 A * 8/1972 Yoshino et al. ............. 502/249
3,692,698 A * 9/1972 Riley et al. .................. 502/220
3,705,886 A * 12/1972 Kashiwa et al. ......... 526/124.5
3,839,536 A * 10/1974 Sato et al. ................... 423/132
3,962,139 A    6/1976 van de Moesdijk et al. 252/463
4,042,532 A * 8/1977 McArthur .................... 502/335
4,064,152 A * 12/1977 McArthur .................... 518/715
4,863,890 A * 9/1989 Koll ............................ 502/230

(Continued)

FOREIGN PATENT DOCUMENTS

EP    0 091 165    10/1983

(Continued)

OTHER PUBLICATIONS

Watanabe et al., "Preparation of highly dispersed Pt+Ru alloy clusters and the activity for the electrooxidation of methanol," *J Electroanal Chem*, 299:395-406 (1997).

*Primary Examiner*—Cam N. Nguyen
(74) *Attorney, Agent, or Firm*—Medlen & Carroll, LLP (57) ABSTRACT

A process for the production of a supported catalyst. The process comprises heating a slurry that comprises a catalyst support and at least one active catalytic ingredient precursor. Gas is introduced to the slurry at a sufficient pressure to reduce the at least one active catalytic ingredient precursor and deposit at least one active catalytic ingredient onto a surface of the catalyst support to form the supported catalyst. The supported catalyst has a large active catalytic surface area.

40 Claims, 2 Drawing Sheets

U.S. PATENT DOCUMENTS

| | | | |
|---|---|---|---|
| 5,171,428 A | 12/1992 | Beattie et al. | 209/166 |
| 5,246,481 A | 9/1993 | Scheie | 75/374 |
| 5,584,908 A | 12/1996 | Scheie | 75/374 |
| 5,928,983 A * | 7/1999 | Culross | 502/170 |
| 6,177,381 B1 * | 1/2001 | Jensen et al. | 502/325 |
| 6,297,185 B1 | 10/2001 | Thompson et al. | 502/101 |
| 6,521,565 B1 * | 2/2003 | Clavenna et al. | 502/325 |
| 6,673,743 B2 | 1/2004 | Lok | 585/276 |
| 6,753,286 B2 * | 6/2004 | Clark et al. | 502/28 |
| 6,818,254 B1 * | 11/2004 | Hoke et al. | 427/429 |
| 2001/0031793 A1 * | 10/2001 | Singleton et al. | 518/715 |

FOREIGN PATENT DOCUMENTS

| | | |
|---|---|---|
| EP | 1 036 784 | 9/2000 |
| JP | 03-245844 | 11/1991 |
| JP | 06-114264 | 4/1994 |
| JP | 10-180113 | 7/1998 |
| JP | 2000-107606 | 4/2000 |
| SU | 151893 | 7/1992 |

* cited by examiner

FIG. 1

10 — Solution Preparation of Active Catalytic Ingredient Precursor(s)

20 — Addition of Catalyst Support to Solution to form a Slurry

30 — Slurry heated and subjected to high temperature high pressure autoclave to precipitate and deposit active catalytic ingredient(s) onto catalyst support to form supported catalyst 40 — Supported catalyst is filtered, washed and dried to produce a clean powder

HYDROMETALLURGICAL PROCESS FOR PRODUCTION OF SUPPORTED CATALYSTS

The present invention claims priority to U.S. Provisional Application 60/387,592 filed on Jun. 12, 2002, the disclosure of which is herein incorporated by reference in its entirety.

FIELD OF THE INVENTION

This invention relates to the production of catalysts. More particularly the present invention relates to the production of supported catalysts having unique characteristic properties and the novel process for the production thereof.

BACKGROUND OF THE INVENTION

Various types of catalysts are known and used in a variety of applications. For example, catalysts may be fused, supported or unsupported and used in applications such as for example purifying exhaust gases. Supported catalysts are typically composed of a catalyst support, active catalytic ingredients provided on the catalyst support and promoters/additives. The catalyst support provides a surface to disperse the active catalytic ingredients, a surface area for contact with reactants, mechanical support for the active catalytic ingredients and a surface to disperse reaction heat around the active catalytic ingredients. The active catalytic ingredient may be selected from metal, metal oxides, metal sulphides and combinations thereof. Promoters and additives are included to modify the properties of the active catalytic ingredients. These properties include, for example, increasing the acidity or basicity of active metal ingredients, creation of special sites for enhancement of catalyst activity and selectivity and increasing the mechanical and thermal properties of the catalyst system.

Catalysts in general have been traditionally produced using conventional techniques of precipitation, co-precipitation, impregnation, co-impregnation, ion-exchange and deposition-precipitation processes that are well known to those skilled in the art. In the case of supported catalysts, these have been typically produced using multi-stage processes which are complicated, expensive, time consuming and often involve unknown complex chemistry and procedures. The variables involved in such multi-stage processes must be carefully monitored and controlled in order to preclude large quality variations of the resultant supported catalysts from lot to lot.

As will be appreciated, catalyst performance depends on a number of catalyst properties. These properties include the dispersion of active catalytic ingredients on the catalyst support, the surface area and pore structure of the catalyst support, the presence of active catalytic sites, and the nature of the catalyst support (acidic or basic catalytic sites). The dispersion of active catalytic ingredients on the catalyst support strongly influences the interaction of the supported catalyst with the process materials stream. Good dispersion combined with the presence of properly oriented active catalytic ingredients sites drives the catalytic reaction to chemical equilibrium faster.

Any small amount of impurities present in the active catalytic ingredients can strongly influence the catalyst performance in a negative manner thus diminishing the effectiveness of the catalyst and its catalytic activity in general.

In a completely unrelated field, hydrometallurgical processes have typically been used in the cladding of core materials with metals, metal oxides, metal sulphides, etc. The most common practical application of this technology relates to cladding of core materials with metals. Hydrometallurgical processes generally involve cladding of a core material having a low specific surface area. For example, graphite cores with an average particle size of about 100 μm are used in the production of nickel clad graphite for electronic shielding applications. These cores have a specific surface area of approximately 0.1 m$^2$/g. In another example, nickel powder of about 20 μm in size is used in the production of nickel clad alumina for hardfacing and has a specific surface area of approximately 0.15 m$^2$/g. For these applications, a thick coating of a deposited metal is generally desirable. In the above-mentioned nickel clad alumina example, it is desirable to coat alumina with a thick layer of several micrometers of nickel for increased wear resistance and ductility in the final product. A cross section of a typical composite particle produced by conventional hydrometallurgical processes includes a core material with low surface area and a thick coating of metal on the particle surface.

Conventional hydrometallurgical processes are used in cladding for purposes such as wear resistance in the case of nickel cladding of alumina and electrical conductivity in the case of nickel cladding of graphite. However, such hydrometallurgical processes have not been contemplated nor developed for the production of catalysts especially supported catalysts where providing a highly active catalytic surface is desired and required. This is because these processes are not satisfactory for the production of catalysts, particularly supported catalysts.

It is therefore an object of an aspect of the present invention to provide a process for the production of a supported catalyst that obviates or mitigates at least some of the disadvantages of the prior art processes. It is further desirable to provide novel and improved supported catalysts.

SUMMARY OF THE INVENTION

According to the present invention, there is provided a novel hydrometallurgical type process for making a supported catalyst. The process is simple, economical and produces supported catalyst at high volumes with excellent quality control and reproducibility.

In one aspect of the present invention, there is provided a process for the production of a supported catalyst, the process comprising:

heating a slurry comprising a catalyst support and at least one active catalytic ingredient precursor and introducing gas to the slurry at a sufficient pressure to reduce the at least one active catalytic ingredient precursor and deposit at least one active catalytic ingredient onto a surface of the catalyst support to form the supported catalyst.

In another aspect of the present invention, the process generally comprises heating a slurry comprising a catalyst support having a high surface area and at least one active catalytic ingredient precursor solution. Hydrogen gas is introduced into the slurry at a sufficient pressure to reduce and deposit substantially pure active catalytic ingredient particles onto a surface of the catalyst support.

In another aspect of the present invention, the step of heating the slurry and introducing the gas may be done simultaneously or, preferably, the slurry is heated to a desired temperature and then the gas is introduced.

Advantageously, the process of the present invention does not require additional and undesirable high temperature treatment after the active catalytic ingredient(s) are deposited onto the catalyst support as is the case with the prior art processes. Such high temperature treatment of the prior art is undesirable because it tends to cause agglomeration of active catalytic ingredient(s) due to their sintering, alloying of active catalytic ingredient(s) due to high temperature diffusion, interaction of active catalytic ingredient(s) with a catalyst support material by diffusion and contamination by various impurities by evaporation, condensation, etc.

The process of the present invention is a novel hydrometallurgical type process that produces a high yield of a unique type of very active supported catalyst. The process of producing the supported catalyst of the present invention is simple relative to the prior art processes. In one aspect, substantially pure catalytic active ingredient(s) are substantially deposited onto the entirety of the catalyst support. The final product is an active supported catalyst with well-defined surface structure. The process results in supported catalysts of known surface morphology that are ready to use. These supported catalysts do not require initial characterization of surface species or contamination removal before the start of the catalytic reaction, as in prior art processes.

In an aspect of the present invention, a most preferred reducing agent used in the process is hydrogen. Other gases may also be used, including CO, $H_2S$, $SO_2$ and $CO_2$ in specific applications depending on the type of desired supported catalyst being produced. Hydrogen can penetrate through small pores and can quickly diffuse through metals at room temperature allowing deposition of active catalytic ingredient(s) in very fine pores, cracks and crevices of the catalyst support. The active catalytic ingredient(s) are well adhered to the catalyst support. The active catalytic ingredient(s) by the present process can deposit into cracks and pores of the catalyst support, thus filling the edges and corners of the catalyst support. Deposition of active catalytic ingredient(s) onto the catalyst support can be closely controlled during the process and consequently the entire morphology and in particular the surface morphology of the final supported catalyst product can be well controlled according to supported catalyst product specification.

Economic advantages are provided as aspects of the present invention permit high throughput and well-defined process chemistry. Also, the amount of active catalytic ingredient(s) deposited onto the catalyst support can be closely controlled. The high pressure and high temperature atmosphere in the autoclave is reducing when, for instance, hydrogen or carbon monoxide are used and therefore the oxidation of metals, even non-noble metals, is precluded. Further, catalyst supports that were previously not considered suitable for deposition with certain active catalytic ingredients may have a first metal deposited thereon and then a desired active catalytic ingredient may be provided on the first metal. This process is suitable for the deposition of more than one active catalytic ingredient, for example, two or more metals.

According to another aspect of the invention is a process for making a supported catalyst, whereby, during the process, active catalytic ingredient precursor(s) are reduced and essentially pure particles of active catalytic ingredient(s) are deposited onto a surface of the catalyst support.

According to another aspect of the invention is a process for making a supported catalyst, whereby, during the process, active catalytic ingredient precursor(s) are reduced and essentially pure particles of active catalytic ingredient(s) are deposited onto a surface of the catalyst support. The catalyst support has a high surface area.

According to still another aspect of the invention is a process for making a supported catalyst, whereby, during the process, active catalytic ingredient precursor(s) are reduced and essentially pure particles of active catalytic ingredient(s) are deposited onto a surface of the catalyst support. The catalyst support is a porous catalyst support.

According to an aspect of the invention there is provided a process for making a supported catalyst comprising a catalyst support having a surface area of about 0.20 $m^2/g$ to about 1000 $m^2/g$ and active catalytic ingredient(s) consistently dispersed on surfaces of the catalyst support, wherein the active catalytic ingredient(s) are provided as separate particles attached to surfaces of the catalyst support, the process comprising:

forming a slurry by the mixing of at least one active catalytic ingredient precursor solution with a porous catalyst substrate;

heating the slurry; and introducing hydrogen gas at an elevated pressure to reduce at least one active catalytic ingredient precursor and deposit at least one substantially pure active catalytic ingredient onto a surface of the catalyst support.

In yet another aspect of the present invention, the process comprises forming a slurry of a selected catalyst support having a surface area from about 0.20 $m^2/g$ to about 1000 $m^2/g$ and a solution of at least one active catalytic ingredient precursor, heating the slurry, introducing hydrogen gas at a pressure for a time sufficient to deposit a substantially consistent layer of at least one substantially pure active catalytic ingredient on and within the pores of the catalyst support to form a supported catalyst. The process further comprises washing and drying the supported catalyst in a manner and time sufficient to provide a clean powder of the supported catalyst.

In the process of the present invention the slurry may be heated to a temperature of up to about 400° C., preferably from about 120° C. to about 250° C. It is understood to one of skill in the art that the temperature is dependent on the type of active catalytic ingredient being deposited onto the support. For example, in the embodiment of nickel as the active catalytic ingredient, the slurry is preferably heated to a temperature from about 150° C. to about 200° C., and more preferably up to about 180° C.

In the process of the present invention, it is also understood by one of skill in the art that the slurry may be subjected to pressures of up to about 5200 psig, preferably up to about 800 psig, more preferably from about 120 to about 800 psig, depending on the type of active catalytic ingredient being deposited onto the support. For example, in the embodiment of nickel as the active catalytic ingredient, the slurry may be subjected to pressures of up to about 600 psig. In general, when the active catalytic ingredient is a metal sulphide the pressure at which the hydrogen is introduced into the slurry is higher than for metals and metal oxides.

In another aspect of the present invention, the process includes forming a slurry of a catalyst support selected from the group consisting of a ceramic such as alumina, zeolite, silica, magnesia, titania, zirconia, yttria stabilized zirconia, copper coated yttria, stabilized zirconia, and diatomaceous earth; carbon; fluorinated carbon; graphite; polymers; and combinations thereof. The catalyst support having a surface area of between about 0.20 $m^2/g$ to about 1000 $m^2/g$. The slurry further includes nickel in the form of nickel ammine sulfate. The process also includes heating the slurry to a temperature of from about 150° C. to about 200° C., introducing hydrogen gas at a pressure of from about 450 psig to about 600 psig for a time sufficient to reduce the nickel ammine sulfate and deposit, preferably, a layer at most about 1.0 μm, and more preferably at most about 0.1

μm, of substantially pure nickel particles onto the catalyst support thus forming a supported catalyst, and washing and drying the supported catalyst in a manner and time sufficient to provide a powder of the supported catalyst.

In another aspect of the present invention, there is provided a process for the production of a supported catalyst, the process comprising forming a slurry of catalyst support selected from the group consisting of a ceramic such as alumina, zeolite, silica, magnesia, titania, zirconia, yttria stabilized zirconia, copper coated yttria, stabilized zirconia and diatomaceous earth; carbon; fluorinated carbon; graphite; polymers; and combinations thereof. The catalyst support having a surface area of from about 0.20 $m^2/g$ to about 1000 $m^2/g$. The slurry further including a precursor of an active catalytic ingredient, wherein the active catalytic ingredient is selected from the group consisting of nickel, cobalt, a precious metal, antimony, arsenic, lead, tin, and combinations thereof. Some examples of catalytic ingredient precursors are nickel ammine sulphate, nickel carbonate, copper ammine sulphate, cobalt ammine sulphate, tin hydroxide and combinations thereof. The process further includes heating the slurry to a temperature of up to about 400° C., introducing hydrogen gas at a pressure of up to about 3800 psig for a time sufficient to reduce the precursor(s) and deposit a layer, preferably, at most about 1.0 μm, and more preferably at most about 0.1 μm, of substantially pure metal particles on the porous catalyst support forming a supported catalyst which is washed and dried in a manner and time sufficient to provide a supported catalyst which has a substantially pure metal coated catalyst support. The supported catalyst has a large active catalytic surface area.

It is understood that the process may be repeated as desired. That is, a supported catalyst as produced by the process of the invention can be subjected to the process again to provide an additional active catalytic ingredient.

In another aspect of the present invention, there is provided a process for the production of a supported catalyst having an average particle diameter up to about 400 μm, the process comprising heating an aqueous slurry of a porous catalyst support having a surface area between about 0.20 $m^2/g$ to about 1000 $m^2/g$ and at least one active catalytic ingredient precursor and introducing gas to the slurry at a sufficient pressure to reduce said at least one active catalytic ingredient precursor and deposit at least one active catalytic ingredient onto a surface of the catalyst support to form the supported catalyst.

In yet another aspect of the present invention there is provided a supported catalyst formed by any one of the processes described above.

In another aspect of the present invention, further steps may be conducted to impart certain properties to the supported catalyst such as to increase the specific surface area of the active catalytic ingredient if oxidation occurs after the production of the supported catalyst or, after production of the supported catalyst, to promote interaction of the active catalytic ingredient with the catalyst support by heating the supported catalyst to elevated temperatures, which thermally activates interaction.

In another aspect of the present invention, there is provided a supported catalyst having improved catalytic performance and high practical value.

In another aspect of the present invention, there is provided a supported catalyst having a direct dispersion of active catalytic ingredient(s) in the form of substantially pure metal, metal oxides, metal sulphides and combinations thereof, on and adhered to the catalyst support.

The supported catalyst of the invention comprises a catalyst support capable of supporting the active catalytic ingredient(s) directly on the external and internal surfaces of the support. The catalyst support is such (i.e. from porous to non-porous) that a substantial amount of substantially pure desired catalytic ingredient(s) may be supported thereon with good adhesion of the active catalytic ingredient(s) to the catalyst support. In general, the catalyst support is selected from any suitable material having a surface area of about 0.20 $m^2/g$ to about 1000 $m^2/g$. As is understood by one of skill in the art, this may include, for example, ceramic materials, metals, polymers and combinations thereof.

In accordance with the invention, the active catalytic ingredient(s) are provided as a "layer" on the catalyst support. As used herein, "layer" is defined as any deposition of catalytic ingredient(s) onto the catalyst support. Such deposition may be in the form of a consistent dispersion of individual active catalytic ingredient(s) provided as small particles. The layer may be at most about 1.0 μm thick, and more preferably at most about 0.1 μm, the individual particles not being in contact with one another. As such, the particles would not conduct electricity from one particle to the next. Alternatively, the deposition of active catalytic ingredient(s) may be in the form of more continuously dispersed particles that may come in contact with adjacent particles. In this instance, the particles would conduct electricity from one particle to the next (note that the concept of electrical conductivity is only included herein to elucidate the "layer" concept). It is also within the scope of the invention to have breaks in the continuous particle deposition. In essence, the process of the present invention can deposit active catalytic ingredient(s) as a layer throughout the entire external surface of the catalytic support, throughout the entire external and internal surfaces of the catalytic support or partially throughout the catalyst support.

In one aspect, the supported catalyst of the invention comprises a generally porous catalyst support with high surface area having a substantially consistent layer of dispersed active catalytic ingredient(s) on the external and internal surfaces of pores of the catalyst support. The active catalytic ingredient(s) may be selected from a variety of metals, metallic compounds such as metal oxides, metal sulphides and combinations thereof. The active catalytic ingredient(s) as provided by the process of the present invention, are well dispersed throughout the catalyst support. This provides for a tremendous amount of surface area for catalytic activity to occur. Furthermore, the provision of the active catalytic ingredients as small particles in a layer of at most about 1.0 μm, more preferably at most about 0.1 μm, also provides a tremendous surface area for catalytic activity.

It is also within the scope of the invention to provide combinations of active catalytic ingredient(s) within a "layer" on the catalyst support.

In accordance with an aspect of the invention, the supported catalysts produced may contain typically up to about 70% by weight active catalytic ingredient(s), preferably up to about 60% by weight active catalytic ingredient(s).

According to an aspect of the present invention there is provided a supported catalyst comprising:

a catalyst support having a high surface area of about 0.20 $m^2/g$ to about 1000 $m^2/g$;

at least one active catalytic ingredient dispersed on surfaces of the catalyst support, wherein the at least one active catalytic ingredient is provided as separate particles attached to a surface of the catalyst support.

According to another aspect of the present invention there is provided a supported catalyst comprising:

a catalyst support having a high surface area of about 0.20 m$^2$/g to about 1000 m$^2$/g;

active catalytic ingredient(s) consistently dispersed on all surfaces of the catalyst support, wherein the active catalytic ingredient(s) are provided as separate particles attached to surfaces of the catalyst support and wherein up to about 70% by weight, preferably up to about 60% by weight and more preferably up to about 50% by weight of active catalytic ingredient(s) and even more preferably up to about 25% by weight is deposited and adhered to the catalyst support.

In another aspect, the supported catalyst of the invention has the active catalytic ingredient(s) well attached to the external and internal surfaces of all of the pores of the porous catalytic support such that many more active catalytic sites are present on the supported catalyst. The adherence of the active catalytic ingredient(s) to the catalytic support is important. Furthermore, the supported catalyst of the invention has a high catalytic activity since essentially pure active catalytic ingredient(s) such as a metal can be "loaded" onto and throughout the catalyst support and even into the smallest pores inside the catalyst support. This is facilitated by the novel process of the present invention in which hydrogen gas is used to deposit active catalytic ingredient(s) into the smallest pores, cracks and crevices of the catalytic support. In this manner, a thick and undesirable coating of active catalytic ingredient(s) is avoided.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will be further understood from the following description with reference to the Figures, in which.

DETAILED DESCRIPTION OF THE PREFERRED EMBODIMENTS

The invention relates to a process for the production of a supported catalyst. The process comprises heating a slurry comprising a catalyst support and at least one active catalytic ingredient precursor and introducing gas to the slurry at a sufficient pressure to reduce the at least one active catalytic ingredient precursor and deposit at least one active catalytic ingredient onto a surface of the catalyst support to form the supported catalyst. In some embodiments, the heating of the slurry and the introduction of the gas may be done simultaneously or the slurry may be heated to a desired temperature followed by the introduction of the gas.

The active catalytic ingredient(s) may be deposited onto external and/or internal surfaces of the catalyst support.

Figure 1:
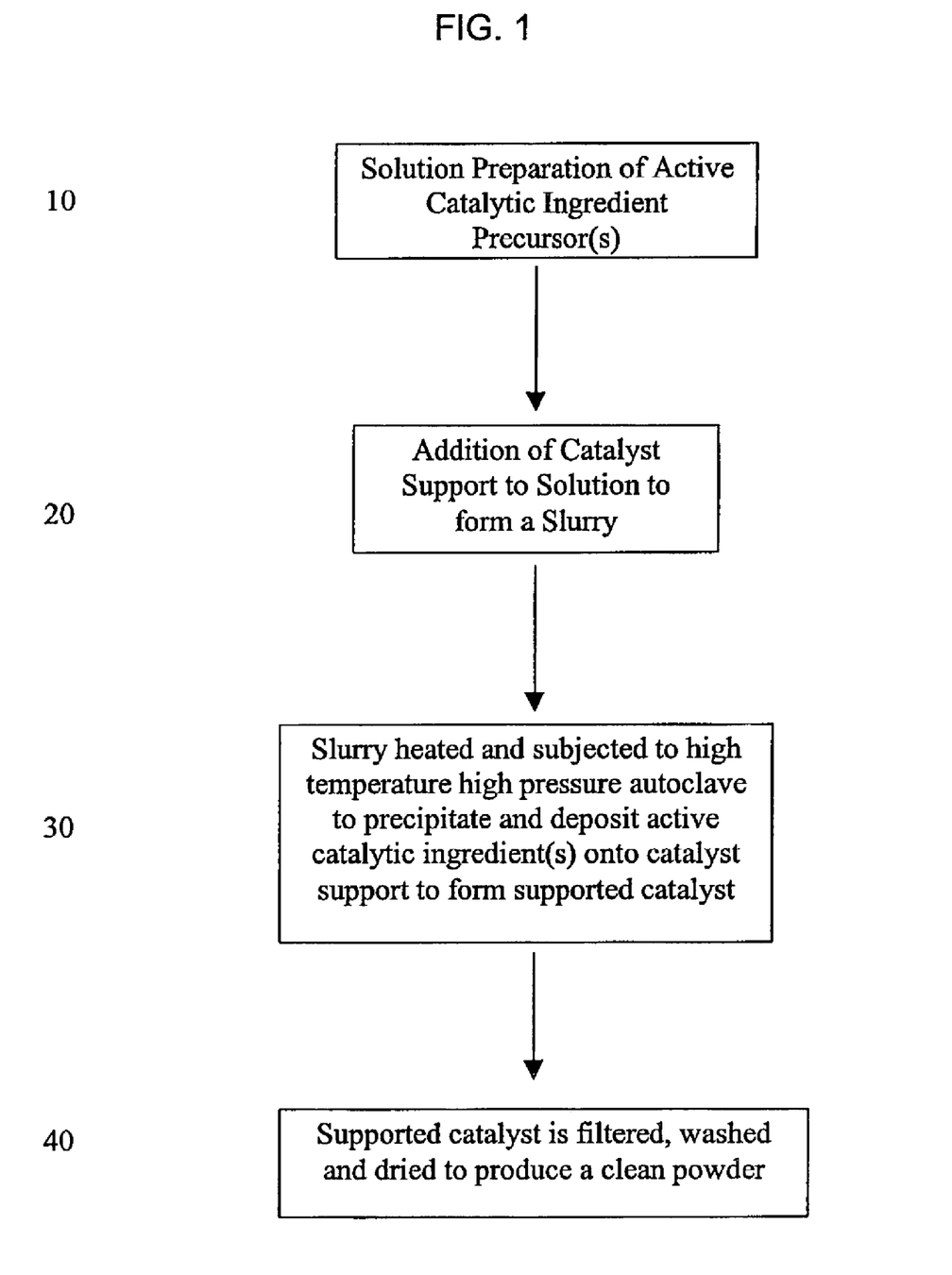
FIG. 1 is a flow chart showing a general process for the production of a supported catalyst according to an embodiment of the present invention.

Reference is made to FIG. 1 to describe in general, a novel process for the production of catalyst materials according to one embodiment of the present invention. At step 10, a solution of at least one active catalytic ingredient precursor is prepared. At step 20, a catalyst support is added to the solution to form a slurry. As used herein "catalyst support" is preferably any suitable material having a surface area of between about 0.20 m$^2$/g to about 1000 m$^2$/g. Thus, the catalyst support may be any material with a high specific surface area. In one aspect, the material is very porous. Suitable catalyst support materials include, but are not limited to, a ceramic such as alumina, zeolite, silica, magnesia, titania, zirconia, yttria stabilized zirconia, copper coated yttria stabilized zirconia and diatomaceous earth; carbon; fluorinated carbon; graphite; polymers; and combinations thereof. It is understood by one of skill in the art that the catalyst support may comprise a variety of shapes and sizes and is selected based on the requirements of the resultant supported catalyst desired. The size and shape of the catalyst support allows for interaction of the active catalytic precursor ingredient(s) with the catalyst support Within the slurry. In many embodiments, the catalyst support is generally spherical or rounded.

The solution of suitable active catalytic ingredient precursor(s) may comprise active catalytic ingredient(s) selected from the group, but not limited to, metals, metal oxides, metal sulphides and combinations thereof. In one embodiment, the active catalytic ingredient precursor may be selected from a desired metal compound, for example, nickel ammine sulfate for providing a coating of nickel (e.g. active catalytic ingredient) on the catalyst support. A concentration of from about 10 g/l to about 60 g/l of nickel ions in solution is preferable. The ammonium sulphate concentration is dependent on the nickel concentration and is typically in the range of about 100 g/l to about 300 g/l. Suitable metal ion concentration in solution is determined based on the reaction chemistry. Other suitable metals that may be used as active catalytic ingredients include, but are not limited to, cobalt from an ammine complex (e.g. cobalt ammine sulphate), copper from an ammine complex (e.g. copper ammine sulphate), tin from tin hydroxide and/or nickel from nickel carbonate. Still other suitable metals for deposition include, but are not limited to, platinum, palladium, copper, ruthenium, cerium, silver and gold. Still other suitable deposition metals include antimony and arsenic. Typical concentrations of the active catalytic ingredient precursor in the solution is such that the resulting active catalytic ingredient concentration is from about 0.001 g/l to about 70 g/l. If the active catalytic ingredient is a non-precious metal such as nickel, the concentration is typically from about 25 g/l to about 65 g/l. If the active catalytic ingredient is a precious metal, the concentration is typically from about 0.001 g/l to about 10 g/l. It is understood by those skilled in the art that the active catalytic ingredient precursor provided in the solution is selected depending on the characteristics desired for the supported catalyst made. The solution of active catalytic ingredient precursors is an aqueous solution.

In an alternative embodiment, solution additives may be added to the solution of suitable active catalytic ingredient precursor(s) for facilitating the deposition of active catalytic ingredient(s) onto the catalyst support. Representative additives include, but are not limited to, ammonium polyacrylate, gum arabic, dextrin, gelatin, dextrose, anthraquinone, oleic fatty acids, stearic fatty acids, and combinations thereof in the range of from about 0.01 g/l to about 20.0 g/l. More preferably, these additives are added in the range of from about 0.1 g/l to about 1.0 g/l. Still, more preferably, these additives are added in the range of from about 0.1 g/l to about 0.5 g/l. The additives used are dependent on the chemical nature and the specific surface area, particle size and the particle size distribution of the catalytic support. In the present embodiment, specific surface areas of the catalyst support and the supported catalyst produced are measured by the BET technique known to those of skill in the art.

The pH of the slurry of catalyst support, active catalytic ingredient precursor(s) and alternatively, additives, is adjusted from about 6 to about 8, preferably, from about 7 to about 8 using a solution of ammonia in water.

At step 30, the slurry is heated to a temperature of up to about 400° C. in a high pressure, high temperature autoclave. The temperature being dependent on the nature of the active catalytic ingredient(s) being deposited on to the catalyst support. One skilled in the art will appreciate that any other suitable type device comparable to a high pressure, high temperature autoclave may be used. The slurry is heated to temperature typically over a period of time of up to about 1 hour and more typically between about 10 minutes to about 35 minutes.

Figure 2A:
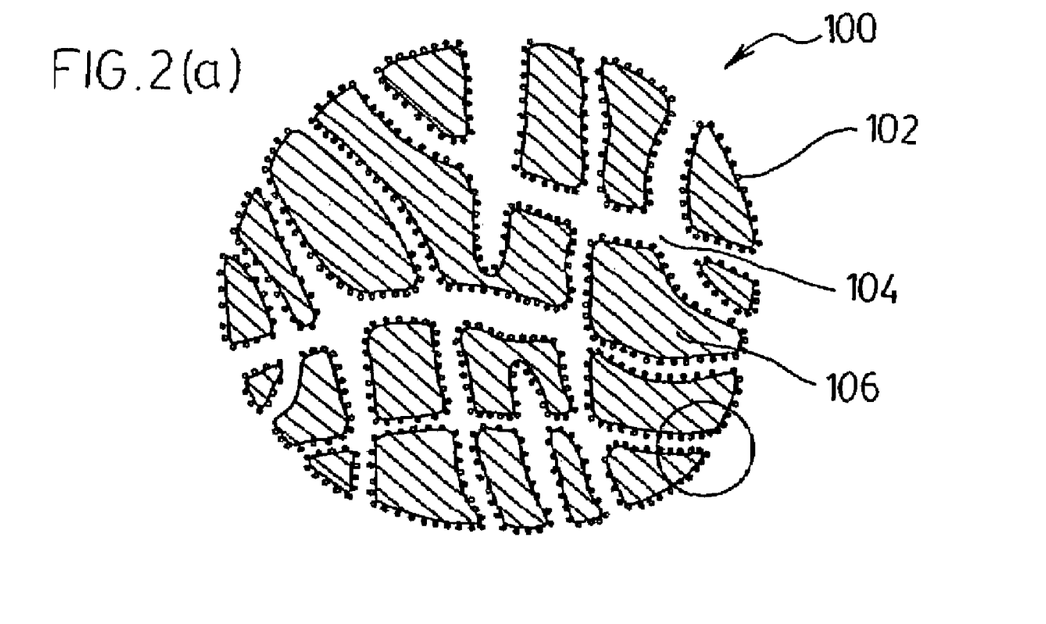
FIG. 2(a) shows a cross section of a typical supported catalyst particle produced according to an embodiment of the present invention.

When the slurry reaches the desired temperature, hydrogen gas is introduced into the high pressure, high temperature autoclave at a pressure of up to about 5200 psig, preferably up to about 800 psig, more preferably from about 120 to about 800 psig, at step 30. The pressure provided is selected with respect to the type of active catalytic ingredient precursor(s) being reduced and deposited. For example, in the case of nickel as the active catalytic ingredient, the pressure provided is from about 450 psig to about 600 psig and, preferably at about 500 psig. The high pressure forces the slurry of active catalytic ingredient precursor(s) into all of the pores of the high surface area catalyst support. The hydrogen gas reduces the active catalytic ingredient precursor(s) from the liquid phase and the active catalytic ingredient(s) deposit as substantially pure metal, on the order of about 99.9% pure, onto the catalyst support resulting in the formation of supported catalyst within a liquid phase. The active catalytic ingredient is typically deposited in a consistent manner in the form of small particles in a layer of at most about 1.0 µm, and more preferably at most about 0.1 µm, dispersed over the external and internal pore surfaces of the catalyst support as is seen in FIG. 2(*a*). Reaction time for this reduction is up to about 30 minutes and more typically between about 5 minutes and about 20 minutes.

In one embodiment, the reduction of nickel ammine sulfate solution in the deposition of substantially pure nickel, the reduction occurs according to the following equation:

The resulting supported catalyst formed is filtered, washed and dried at step 40. Washing techniques for catalyst powders are well known to those of skill in the art. In the present embodiment, the supported catalyst is washed in a vacuum filter until the conductivity of the water before passing through the filter is equal to the conductivity of the water after passing through the filter. In an alternative embodiment, organic solvents are used after the water wash. The water eliminates the ammonium sulphate that remains in the filtered supported catalyst and the organic solvents eliminate remaining traces of organic material contamination and speed up the subsequent drying of the supported catalyst. In the example provided above, the slurry including the supported catalyst and the liquid phase, contains a high concentration of ammonium sulfate of up to 300 g/l after precipitation of nickel onto the catalyst support. In the embodiment of a porous catalyst support with a high specific surface area, the washing is more difficult than with low specific surface area powders. Therefore, in this aspect, washing should be more diligently controlled.

The step of drying is dependent on the supported catalyst requirements. For example, vacuum drying may be used to inhibit oxidation during drying, with subsequent packaging under an inert atmosphere, such as argon. Conventional methods of drying powders are not necessarily suitable for drying the supported catalyst of the present invention since the specific surface area of the supported catalyst may be large and thus, reaction with oxygen may easily occur. For example, during the step of drying, a powder of a porous supported catalyst of 15% Ni on Al$_2$O$_3$ of 80 µm average particle diameter behaves like a submicron nickel powder rather than a nickel powder of 80 µm. This is due to the fine dispersion of nickel particles that are submicron in size.

The supported catalyst of the present invention, formed by the process of the present invention, comprises active catalytic ingredient(s) deposited onto a surface of the catalyst support. Preferably, the supported catalyst includes a catalyst support with high specific surface area and active catalytic ingredient(s) dispersed thereon as either individual tiny particles dispersed over the entirety of the surfaces of pores of the catalyst support (FIG. 2(*a*)) or having the dispersion of particles of active catalytic ingredient more continuous such that individual particles may contact each other. This provides a tremendous surface area for catalytic activity to occur and therefore the supported catalysts of the present invention are highly reactive and desirable for use in a variety of applications. Generally, the layer of the catalytic ingredient particles over the external and internal surfaces of the pores of the catalyst support is on the order of at most about 1.0 µm, and more preferably at most about 0.1 µm. It is understood by those of skill in the art that a continuous layer of active catalytic ingredient(s) on the catalyst support is not necessarily required. The present process provides for a continuous dispersion of the active catalytic ingredient as particles throughout the pore surfaces such that small gaps are present. Good and substantially even dispersion of the active catalytic ingredient is generally provided on the support by the process of the present invention.

In other embodiments, the supported catalyst, as just described having a layer of active catalytic ingredient(s) over the external and internal surfaces of the pores of the catalyst support, may be subjected to the process of the present invention a number of times in order to provide additional deposits of dispersed catalytic ingredient particles as desired. In this manner, a variety of different active catalytic ingredient(s) and combinations of active catalyst ingredient(s) may be provided as desired for specific applications. Typically, supported catalyst particles of the present invention may have an average particle diameter up to about 400 µm, and more preferably up to about 200 µm. Preferred ranges are from about 1 µm to about 150 µm; from about 1 µm to about 30 µm; and 45 µm to about 105 µm.

Figure 2B:
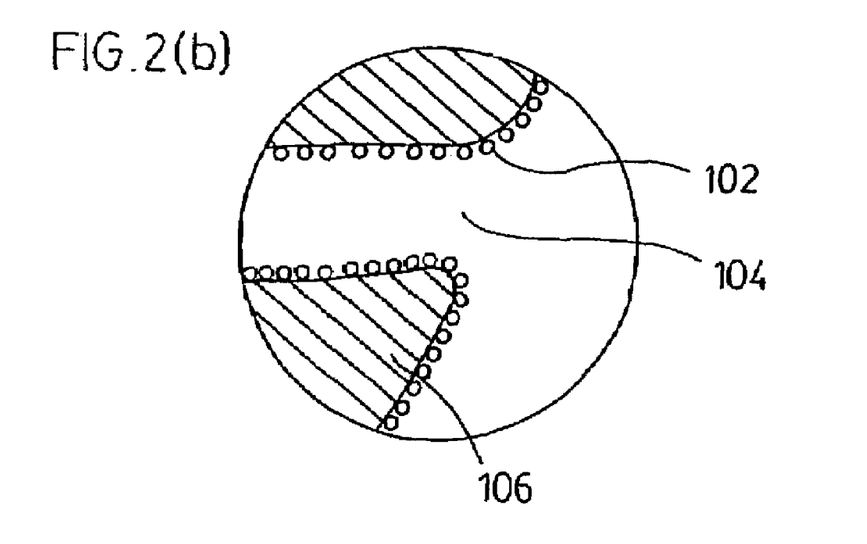
FIG. 2(b) shows a larger scale partial cross section of the catalyst particle of FIG. 2(a).

FIG. 2(a) shows a cross section of a typical supported catalyst particle, indicated generally by the numeral 100, and FIG. 2(b) more closely shows a portion of the cross section of the typical supported catalyst 100 produced according to an embodiment of the present invention. The supported catalyst 100 has active catalytic ingredient particles 102 on the pore surfaces 104 of the catalyst support 106.

In another embodiment of the present invention, active catalytic ingredient(s) other than pure metals are deposited onto catalyst supports by the process of FIG. 1. Examples of other active catalytic ingredient(s) include, but are not limited to, metal oxides, metal sulphides, combinations thereof. In particular embodiments, some of these active catalytic ingredient(s), such as oxides, are used "as-is" without any further treatments such as oxidation of pure metals. These oxides include, but are not limited to, $Al_2O_3$, CdO, $Cr_2O_3$, $CoO_3$, $Cu_2O$, $Fe_3O_4$, MgO, $Mn_3O_4$, MnO, $MnO_2$, $MoO_2$, NiO, $UO_3$, $U_3O_8$, $UO_2$, $V_2O_3$, ZnO and combinations thereof. There are many active catalytic ingredient precursors for these oxides. Most precursors are nitrates but some are carbonates and other salts. For example, for $Al_2O_3$, the precursor may be $Al(NO_3)_2$.

It will be appreciated by those of skill in the art that several modifications and variations of active catalytic ingredients and catalyst support materials are possible. For example, rather than dispersing a single active catalytic ingredient on a single catalyst support, more than one active catalytic ingredient can be dispersed on a single catalyst support, or on different catalyst supports. For example, one active catalytic ingredient, such as a given metal, can be dispersed on two or more catalytic supports. Also, two or more metals can be deposited onto a catalyst support in one step in the high pressure and high temperature reduction process. The production of many combinations of active catalytic ingredients and catalyst supports in one step are possible.

In another embodiment, a ceramic catalyst support may be coated with an intermediate layer of metal, followed by a coating of another active catalytic ingredient. For example, yttria stabilized zirconia may be precoated with copper, prior to deposition with nickel, due to inherent problems of depositing nickel directly on some types of yttria stabilized zirconia. No solution additives are necessary for nickel coating of copper coated yttria stabilized zirconia.

The supported catalyst can be modified by alloying with chromium, aluminum and other suitable metals or non-metals after being produced, i.e. after step 40 (FIG. 1). For instance, the nickel deposited onto a ceramic catalyst support can be chromized, aluminized or chromized and aluminized to create NiCr, NiAl or NiCrAl alloy active catalytic ingredient(s) on the catalyst support. Other alloying elements (B, Si, etc.) and several alloying techniques (PVD, CVD, etc.) are contemplated.

In some special cases the active catalytic ingredient(s) are further processed after step 40 (FIG. 1) to impart the supported catalyst with additional properties. Such processing steps may include, but are not limited to, thermal treatment to change the structure and composition of the active catalytic ingredient(s); alloying of the active catalytic ingredient(s) with various elements to tailor the catalytic performance of the supported catalyst to a specific process; placing the supported catalyst in oil to provide a pastille; introducing gas, such as hydrogen, to a supported catalyst containing metal oxide or a supported catalyst containing metal sulphide to reduce the metal oxide or the metal sulphide to form a supported catalyst containing a pure metal.

It will be appreciated that the supported catalysts produced by the process of the present invention can be used as a starting material to produce pellets and other agglomerated shapes useful in many catalytic applications.

EXAMPLES

The following are examples of the production of catalyst materials according to aspects of the present invention. These examples are provided for exemplary purposes only and are not intended to limit the scope of the present invention.

Example 1

Supported catalyst made by precipitation of nickel onto low surface area alumina catalyst support by the process described in FIG. 1. The details are presented below.

| | |
|---|---|
| Cladding Solution Volume: | 2 litres |
| Cladding Solution Type: | Nickel ammine sulphate |
| Cladding Solution Nickel Concentration: | 22.5 g/litre |
| Anthraquinone: | 0.2 g/litre |
| Gelatin: | 0.4 g/litre |
| Catalyst Support Type: | Alumina |
| Catalyst Support Weight: | 311 grams |
| Catalyst Support Specific Surface Area: | 0.26 $m^2/g$ |
| Reduction Gas: | Hydrogen |
| Hydrogen Pressure: | 500 psig |
| Reduction Temperature: | 180° C. |
| Reaction completed in 9 minutes | |
| Production (Supported Catalyst) | |
| Ni = 14.3 weight %, $Al_2O_3$ = bal. | |
| Microtrac Particle Size (μm): | D10 = 51, D50 = 97.5, D90 = 84.7 |
| Specific Surface Area: | 0.87 $m^2/g$ |

Example 2

Supported catalyst made by precipitation of nickel onto high surface area alumina catalyst support by the process described in FIG. 1. The details are presented below.

| | |
|---|---|
| Cladding Solution Volume: | 2.5 litres |
| Cladding Solution Type: | Nickel ammine sulphate |
| Cladding Solution Nickel Concentration: | 22.5 g/litre |
| Anthraquinone: | 0.2 g/litre |
| Gelatin: | 0.4 g/litre |
| Catalyst Support Type: | Alumina |
| Catalyst Support Weight: | 311 grams |
| Catalyst Support Specific Surface Area: | 184 $m^2/g$ |
| Reduction Gas: | Hydrogen |
| Hydrogen Pressure: | 500 psig |
| Reduction Temperature: | 180° C. |
| Reaction completed in 9 minutes | |
| Production (Supported Catalyst) | |
| Ni = 11.1 weight %, $Al_2O_3$ = bal. | |
| Microtrac Particle Size (μm): | D10 = 31.4, D50 = 82, D90 = 107.1 |
| Specific Surface Area: | 294 $m^2/g$ |

Example 3

Supported catalyst made by precipitation of nickel and palladium on alumina catalyst support by the process described in FIG. 1. The details are presented below.

| | |
|---|---|
| Cladding Solution Volume: | 2.5 litres |
| Cladding Solution Type: | Nickel ammine sulphate & Palladium chloride |
| Cladding Nickel Concentration: | 22.5 g/litre |
| Pd Concentration: | 0.007 g/litre |
| Anthraquinone: | 0.2 g/litre |
| Gelatin: | 0.4 g/litre |
| Catalyst Support Type: | Alumina |
| Catalyst Support Weight: | 311 grams |
| Catalyst Support Specific Surface Area: | 0.42 m$^2$/g |
| Reduction Gas: | Hydrogen |
| Hydrogen Pressure: | 500 psig |
| Reduction Temperature: | 180° C. |
| Reaction completed in 9 minutes | |
| Product (Supported Catalyst) | |
| Ni = 13.6 weight %, | |
| Pd = 0.005 weight %, | |
| Al$_2$O$_3$ = bal. | |
| Microtrac Particle Size (μm): | D10 = 55.6, D50 = 103.5, D90 = 71.3 |
| Specific Surface Area: | 9.0 m$^2$/g |

Example 4

Supported catalyst made by precipitation of nickel on TiO$_2$ catalyst support by the process described in FIG. 1. The details are presented below.

| | |
|---|---|
| Cladding Solution Volume: | 2.5 litres |
| Cladding Solution Type: | Nickel ammine sulphate |
| Cladding Solution Nickel Concentration: | 45 g/litre |
| Anthraquinone: | 0.2 g/litre |
| Gelatin: | 0.4 g/litre |
| Catalyst Support Type: | TiO$_2$ |
| Catalyst Support Weight: | 460.4 grams |
| Catalyst Support Specific Surface Area: | 82 m$^2$/g |
| Reduction Gas: | Hydrogen |
| Hydrogen Pressure: | 500 psig |
| Reduction Temperature: | 180° C. |
| Reaction completed in 6 minutes | |
| Product (Supported Catalyst) | |
| Ni = 19.8 weight %, TiO$_2$ = bal. | |
| Microtrac Particle Size (μm): | D10 = 0.55, D50 = 1.01, D90 = 4.89 |
| Specific Surface Area: | 100 m$^2$/g |

Example 5

Supported catalyst made by precipitation of nickel on zeolite catalyst support by the process described in FIG. 1. The details are presented below.

| | |
|---|---|
| Cladding Solution Volume: | 2.5 litres |
| Cladding Solution Type: | Nickel ammine sulphate |
| Cladding Solution Nickel Concentration: | 45 g/litre |
| Anthraquinone: | 0.2 g/litre |
| Gelatin: | 0.4 g/litre |
| Catalyst Support Type: | Zeolite |
| Catalyst Support Weight: | 460.4 grams |
| Catalyst Support Specific Surface Area: | 26.0 m$^2$/g |
| Reduction Gas: | Hydrogen |
| Hydrogen Pressure: | 500 psig |
| Reduction Temperature: | 180° C. |
| Reaction completed in 8 minutes | |
| Product (Supported Catalyst) | |
| Ni = 21.3 weight %, Zeolite = bal. | |
| Microtrac Particle Size (μm): | D10 = 2.9, D50 = 5.9, D90 = 10.8 |
| Specific Surface Area: | 30.3 m$^2$/g |

Example 6

Supported nickel oxide catalyst made by precipitation of nickel on silica catalyst support by the process described in FIG. 1. The details are presented below.

| | |
|---|---|
| Cladding Solution Volume: | 2.5 litres |
| Cladding Solution Type: | Nickel ammine sulphate |
| Cladding Solution Nickel Concentration: | 15.5 g/litre |
| Anthraquinone: | 0.2 g/litre |
| Gelatin: | 0.4 g/litre |
| Catalyst Support Type: | Silica |
| Catalyst Support Weight: | 161 grams |
| Catalyst Support Specific Surface Area: | 63 m$^2$/g |
| Reduction Gas: | Hydrogen |
| Hydrogen Pressure: | 500 psig |
| Reduction Temperature: | 180° C. |
| Reaction completed in 20 minutes | |
| Product (Supported Catalyst) | |
| Ni = 14.6 weight %, Silica = bal. | |
| Microtrac Particle Size (μm): | D10 = 70, D50 = 105, D90 = 147 |
| Specific Surface Area: | 81 m$^2$/g |

Example 7

Supported catalyst made by precipitation of platinum on carbon black catalyst support by the process described in FIG. 1. The details are presented below.

| | |
|---|---|
| Cladding Solution Volume: | 2.0 litres |
| Cladding Solution Type: | Platinum chloride |
| Pt Concentration: | 0.55 g/litre |
| Anthraquinone: | 2.5 g/litre |
| Gelatin: | 0.5 g/litre |
| Catalyst Support Type: | Carbon Black |
| Catalyst Support Weight: | 10.0 grams |
| Catalyst Support Specific Surface Area: | 350 m$^2$/g |
| Reduction Gas: | Hydrogen |
| Hydrogen Pressure: | 500 psig |
| Reduction Temperature: | 180° C. |
| Reaction completed in 22 minutes | |
| Product (Supported Catalyst) | |
| Pt = 15.0 weight %, | |
| Carbon Black = bal. | |
| Microtrac Particle Size (μm): | D10 = 17, D50 = 65, D90 = 90 |
| Specific Surface Area: | 380 m$^2$/g |

Example 8

Supported catalyst made by precipitation of platinum on high surface area carbon black catalyst support by the process described in FIG. 1. The details are presented below.

| | |
|---|---|
| Cladding Solution Volume: | 2.0 litres |
| Cladding Solution Type: | Platinum chloride |
| Pt Concentration: | 0.4 g/litre |
| Anthraquinone: | 2.5 g/litre |
| Gelatin: | 0.5 g/litre |
| Catalyst Support Type: | Carbon Black |
| Catalyst Support Weight: | 10.0 grams |
| Catalyst Support Specific Surface Area: | 720 m$^2$/g |
| Reduction Gas: | Hydrogen |
| Hydrogen Pressure: | 500 psig |
| Reduction Temperature: | 180° C. |
| Reaction completed in 20 minutes | |
| Product (Supported Catalyst) | |
| Pt = 10.0 weight %, Carbon Black = bal. | |
| Specific Surface Area: | 850 m$^2$/g |

Example 9

Supported catalyst made by precipitation of Ni on copper coated yttria stabilized ZrO₂ catalyst support by the process described in FIG. 1. The details are presented below.

| | |
|---|---|
| Cladding Solution Volume: | 2.5 litres |
| Cladding Solution Type: | Nickel ammine sulphate |
| Cladding Solution Nickel Concentration: | 42 g/litre |
| Catalyst Support Type: | Cu on yttria stabilized ZrO₂ |
| Catalyst Support Weight: | 160.0 grams |
| Catalyst Support Specific Surface Area: | 3.0 m²/g |
| Reduction Gas: | Hydrogen |
| Hydrogen Pressure: | 500 psig |
| Reduction Temperature: | 180° C. |
| Reaction completed in 15 minutes | |
| Product (Supported Catalyst) | |
| Ni = 50.6 weight %, | |
| Cu = 5 weight %, ZrO₂ = bal. | |
| Microtrac Particle Size (μm): | D10 = 8.9, D50 = 25.8, D90 = 39.5 |
| Specific Surface Area: | 4.7 m²/g |

Example 10

Supported catalyst made by precipitation of nickel on alumina catalyst support by the process described in FIG. 1. The details are presented below.

| | |
|---|---|
| Cladding Solution Volume: | 2.5 litres |
| Cladding Solution Type: | Nickel ammine sulphate |
| Cladding Solution Nickel Concentration: | 53.9 g/litre |
| 9,10-dihydro-3,4-dihydroxy-9,10-dioxo-2-anthracenesulfonic acid: | 37.5 ml |
| Catalyst Support Type: | α-Al₂O₃; –270 mesh |
| Catalyst Support Weight: | 517.6 grams |
| Catalyst Support Specific Surface Area: | 10.4 m²/g |
| Reduction Gas: | Hydrogen |
| Hydrogen Pressure: | 500 psig |
| Reduction Temperature: | 180° C. |
| Reaction completed in 30 minutes | |
| Product (Supported Catalyst) | |
| Ni = 9.35 weight %, Al₂O₃ = bal. | |
| Microtrac Particle Size (μm): | D10 = 11.6, D50 = 45.3, D90 = 98.7 |
| Specific Surface Area: | 43.9 m²/g |
| Phases present in the Product (X-Ray Diffraction): | Al₂O₃, NiS, AlNi₃ |

Example 11

Supported catalyst made by precipitation of nickel on diatomaceous earth catalyst support by the process described in FIG. 1. The details are presented below.

| | |
|---|---|
| Cladding Solution Volume: | 0.690 litres |
| Cladding Solution Type: | Nickel ammine sulphate |
| Cladding Solution Nickel Concentration: | 14.90 g/litre |
| Catalyst Support Type: | Diatomaceous Earth, 5 μm |
| Catalyst Support Weight: | 100 grams |
| Catalyst Support Specific Surface Area: | 5.0 m²/g |
| Reduction Gas: | Hydrogen |
| Hydrogen Pressure: | 500 psig |
| Reduction Temperature: | 180° C. |
| Reaction completed in 1 minute | |
| Product (Supported Catalyst) | |
| Ni = 23.8 weight %, | |
| Diatomaceous Earth = bal. | |
| Microtrac Particle Size (μm): | D10 = 2.116, D50 = 6.061, D90 = 17.81 |
| Specific Surface Area: | 14.20 m²/g |

Catalyst Performance

In order to evaluate the catalytic performance of the supported catalysts produced, the following tests were carried out. The catalyst prepared in example 1 and 2 were tested for steam reforming of methane for the production of hydrogen using fixed bed reactor system, as would be understood by those of skill in the area, using the following experimental conditions.

| | |
|---|---|
| Catalytic Reactor Tube Material: | Stainless Steel |
| Catalytic Reactor Dimensions: | O.D. = 9.5 mm, I.D. = 6.4 mm |
| Catalyst Weight: | 0.5 g |
| Catalytic Reactor Bed Volume: | 0.5 ml |
| Catalytic Reactor Height: | 15.5 mm |
| CH₄ Feed Rate: | 84 mls/min at STP |
| Steam/Methane Ratio: | 3.5 mol |
| Hydrogen/Methane Ratio: | 1 mol |
| Catalytic Reactor Pressure: | 5 bar |
| Reactor Temperature | 650° C. |

$CH_4$ conversion was calculated using the following equation:

$$(YCO+YCO_2)/(YCH_4+YCO+YCO_2)$$

The $CH_4$ conversion for catalyst prepared in example 1 was 26%, and for catalyst prepared in example 2 was 36%.

Although preferred embodiments of the invention have been described herein in detail, it will be understood by those skilled in the art that variations may be made thereto without departing from the spirit of the invention.

What is claimed is:

1. A process for the production of a supported catalyst, the process comprising:
   heating a slurry comprising a catalyst support and at least one active catalytic ingredient precursor and introducing gas to the slurry at a sufficient pressure to reduce said at least one active catalytic ingredient precursor and deposit at least one active catalytic ingredient onto a surface of the catalyst support to form the supported catalyst, wherein the pressure is from about 120 to about 800 psig and the slurry has a pH of from about 6 to about 8, and wherein the supported catalyst comprises particles having an average particle diameter of 45 μm to 105 μm.

2. The process of claim 1, wherein said at least one active catalytic ingredient is deposited onto external and/or internal surfaces of the catalyst support.

3. The process of claim 1, wherein the catalyst support has a surface area from about 0.20 m²/g to about 1000 m²/g.

4. The process of claim 1, wherein the catalyst support is a porous catalyst support.

5. The process of claim 1, wherein the catalyst support is selected from the group consisting of a ceramic, carbon, fluorinated carbon, graphite, polymers, and combinations thereof.

6. The process of claim 1, wherein the catalyst support is a ceramic selected from the group consisting of alumina, zeolite, silica, magnesia, titania, zirconia, yttria stabilized zirconia, copper coated yttria stabilized zirconia and diatomaceous earth.

7. The process of claim 1, wherein said at least one active catalytic ingredient precursor is selected from the group consisting of a metal precursor, a metal oxide precursor, a metal sulphide precursor and combinations thereof.

8. The process of claim 7, wherein said at least one active catalytic ingredient precursor is selected from the group consisting of nickel ammine sulphate, nickel carbonate, copper ammine sulphate, cobalt ammine sulphate, tin hydroxide and combinations thereof.

9. The process of claim 1, wherein said at least one active catalytic ingredient is selected from the group consisting of a metal, a metal oxide, a metal suiphide and combinations thereof.

10. The process of claim 1, wherein said at least one active catalytic ingredient is a substantially pure metal.

11. The process of claim 1, wherein said at least one active catalytic ingredient is selected from the group consisting of nickel, cobalt, a precious metal, antimony, arsenic, lead, tin, oxides thereof, suiphides thereof and combinations thereof.

12. The process of claim 1, wherein a layer of said at least one active catalytic ingredient is deposited onto the catalyst support, wherein the layer has a thickness of at most about 1 μm.

13. The process of claim 1, wherein the gas is selected from the group consisting of hydrogen, hydrogen sulphide, carbon dioxide, sulphur dioxide, carbon monoxide and combinations thereof.

14. The process of claim 1, wherein the concentration of said at least one active catalytic ingredient precursor is such that a concentration of said at least one active catalytic ingredient from about 0.001 g/l to about 70 g/l is provided.

15. The process of claim 14, wherein said at least one active catalytic ingredient concentration is from about 25 g/l to about 65 g/l, wherein the active catalytic ingredient is a non-precious metal.

16. The process of claim 14, wherein said at least one active catalytic ingredient concentration is from about 0.001 g/l to about 1 g/l, wherein the active catalytic ingredient is a precious metal.

17. The process of claim 1, wherein the slurry is formed by mixing the catalyst support and a solution of said at least one active catalytic ingredient.

18. The process of claim 1, wherein the step of heating the slurry and introducing the gas is either done simultaneously or the slurry is heated to a desired temperature, followed by the introduction of the gas.

19. The process of claim 1, wherein the slurry is heated to a temperature up to about 400° C.

20. The process of claim 19, wherein the slurry is heated to a temperature of from about 120° C. to about 250° C.

21. The process of claim 1, wherein said at least one active catalytic ingredient is present up to about 70% by weight based on the total weight of the supported catalyst.

22. The process of claim 1, wherein the supported catalyst comprises particles having an average particle diameter up to about 400 μm.

23. The process of claim 1, further comprising washing and drying the supported catalyst.

24. The process of claim 1, whereby, after forming the supported catalyst, the process is repeated, wherein the supported catalyst is the catalyst support.

25. The process of claim 1, wherein the slurry further comprises a solution additive for facilitating the deposition of said at least one active catalytic ingredient.

26. The process of claim 25, wherein the solution additive is selected from the group consisting of ammonium polyacrylate, gum arabic, dextrin, gelatin, dextrose, anthraquinone, oleic fatty acids, stearic fatty acids, and combinations thereof.

27. The process of claim 1, wherein reaction time for said introducing is from 5 minutes to 20 minutes.

28. A process for the production of a supported catalyst having an average particle diameter up to about 400 μm, the process comprising:
heating an aqueous slurry of a porous catalyst support having a surface area between about 0.20 $m^2/g$ to about 1000 $m^2/g$ and at least one active catalytic ingredient precursor and introducing gas to the slurry at a sufficient pressure to reduce said at least one active catalytic ingredient precursor and deposit at least one active catalytic ingredient onto a surface of the catalyst support to form the supported catalyst, wherein the pressure is from about 120 to about 800 psig and the slurry has a pH of from about 6 to about 8, and wherein the supported catalyst comprises particles having an average particle diameter of 45 μm to 105 μm.

29. The process of claim 28, wherein said at least one active catalytic ingredient is deposited onto external and/or internal surfaces of the catalyst support.

30. The process of claim 28, wherein the catalyst support is selected from the group consisting of a ceramic, carbon, fluorinated carbon, graphite, polymers, and combinations thereof.

31. The process of claim 28, wherein the catalyst support is a ceramic selected from the group consisting of alumina, zeolite, silica, magnesia, titania, zirconia, yttria stabilized zirconia, copper coated yttria stabilized zirconia and diatomaceous earth.

32. The process of claim 31, wherein said at least one active catalytic ingredient is selected from the group consisting of nickel, cobalt, a precious metal, antimony, arsenic, lead, tin, oxides thereof suiphides thereof, and combinations thereof.

33. The process of claim 32, wherein the concentration of said at least one active catalytic ingredient precursor is such that a concentration of said at least one active catalytic ingredient from about 25 g/l to about 65 g/l is provided.

34. The process of claim 31, wherein said at least one active catalytic ingredient is selected from the group consisting of substantially pure nickel, nickel oxide, nickel suiphide, and combinations thereof.

35. The process of claim 28, wherein the gas is selected from the group consisting of hydrogen, hydrogen suiphide, carbon dioxide, sulphur dioxide, carbon monoxide and combinations thereof.

36. The process of claim 35, wherein the gas is hydrogen.

37. The process of claim 28, wherein the slurry is heated to a temperature of from about 120° C. to about 250° C.

38. The process of claim 28, wherein said at least one active catalytic ingredient is present up to about 70% by weight based on the total weight of the supported catalyst.

39. The process of claim 28, further comprising washing and drying the supported catalyst.

40. The process of claim 28, wherein reaction time for said introducing is from 5 minutes to 20 minutes.

* * * * *